(12) United States Patent
Straathof et al.

(10) Patent No.: US 12,516,000 B2
(45) Date of Patent: Jan. 6, 2026

(54) ENERGETIC MATERIALS

(71) Applicant: Nederlandse Organisatie voor toegepast-natuurwetenschappelijk onderzoek TNO, s-Gravenhage (NL)

(72) Inventors: Michiel Hannes Straathof, Delft (NL); Christoffel Adrianus Van Driel, Delft (NL); Aafke Tessa Ten Cate, 's-Hertogenbosch (NL)

(73) Assignee: Nederlandse Organisatie voor toegepast-natuurwetenschappelijk onderzoek TNO, 's-Gravenhage (NL)

( * ) Notice: Subject to any disclaimer, the term of this patent is extended or adjusted under 35 U.S.C. 154(b) by 531 days.

(21) Appl. No.: 17/556,848

(22) Filed: Dec. 20, 2021

(65) Prior Publication Data

US 2022/0274898 A1   Sep. 1, 2022

Related U.S. Application Data

(62) Division of application No. 16/087,440, filed as application No. PCT/NL2017/050174 on Mar. 22, 2017, now abandoned.

(30) Foreign Application Priority Data

Mar. 22, 2016 (EP) .................................. 16161647

(51) Int. Cl.
| | |
|---|---|
| *C06B 45/10* | (2006.01) |
| *B29C 64/124* | (2017.01) |
| *B33Y 10/00* | (2015.01) |
| *B33Y 70/00* | (2020.01) |
| *C06B 21/00* | (2006.01) |
| *C06B 25/34* | (2006.01) |
| *C06B 45/00* | (2006.01) |

(52) U.S. Cl.
CPC ............ *C06B 45/10* (2013.01); *B29C 64/124* (2017.08); *B33Y 10/00* (2014.12); *B33Y 70/00* (2014.12); *C06B 21/0025* (2013.01); *C06B 21/0058* (2013.01); *C06B 21/0083* (2013.01); *C06B 25/34* (2013.01); *C06B 45/00* (2013.01)

(58) Field of Classification Search
None
See application file for complete search history.

(56) References Cited

U.S. PATENT DOCUMENTS

| | | | | | |
|---|---|---|---|---|---|
| H285 | H | * | 6/1987 | Downs ........................... | 149/82 |
| 5,509,355 | A | * | 4/1996 | Stewart ..................... | C06C 5/04 |
| | | | | | 102/275.1 |
| 5,939,660 | A | * | 8/1999 | Fogle, Jr. ................ | F42B 3/103 |
| | | | | | 102/202.7 |
| 6,305,286 | B1 | * | 10/2001 | Fogle, Jr ................... | C06C 7/00 |
| | | | | | 102/202.7 |
| 8,206,522 | B2 | * | 6/2012 | Sandstrom ............... | C06C 7/00 |
| | | | | | 149/109.2 |
| 8,425,703 | B1 | * | 4/2013 | Michienzi ............ | C06B 45/105 |
| | | | | | 149/43 |

\* cited by examiner

*Primary Examiner* — Aileen B Felton
(74) *Attorney, Agent, or Firm* — Studebaker Brackett PLLC

(57) ABSTRACT

The invention is directed to a radiation curable energetic composition, to a method of forming a three-dimensional energetic object, to a three-dimensional energetic object, and to uses of the radiation curable energetic composition.
The radiation curable energetic composition of the invention comprises
(a) one or more polymerisable components,
(b) one or more polymerisation initiators, and
(c) one or more energetic components.

27 Claims, No Drawings

ENERGETIC MATERIALS

This application is a Divisional of U.S. patent application Ser. No. 16/087,440 filed Sep. 21, 2018, which is the U.S. National Stage of International Application No. PCT/NL2017/050174 filed Mar. 22, 2017, which claims benefit of priority to European Patent Application No. 16161647.9 filed Mar. 22, 2016, the entire contents of which are incorporated herein by reference.

The invention is directed to a radiation curable energetic composition, to a method of forming a three-dimensional energetic object, to a three-dimensional energetic object, and to uses of the radiation curable energetic composition.

Propellant charges are used in pyrotechnics and ballistics in order to accelerate a piston or a projectile. Typically, the propellant charge is ignited by a primer, which is a small amount of sensitive explosive. Gases produced by combustion of the propellant charge cause a rapid build-up of pressure. When a certain pressure is reached, the projectile begins to move, thereby causing an increase in chamber volume. After a pressure maximum is reached, typically the pressure decreases relatively rapidly due to the expansion of the chamber volume.

A propellant charge is an amount of relatively insensitive but powerful energetic material that propels the projectile out of the gun barrel. Various types of propellant charges having different composition and geometries are used for different applications and purposes.

The propellants used are typically solid. Examples of propellants that are in use today include gun powders, including smokeless powders. Smokeless powders may be considered to be classed as either single or multi-base powders. Conventional smokeless powders consist mainly of nitrocellulose. Typical production processes include drying of water-wet nitrocellulose, mixing and kneading with ether and alcohol and other constituents, pressing the propellant dough through a die, cutting the obtained strand into propellant grains, and drying these grains. Although called powders, they are not in powder form, but in granule form.

In single-base propellants, nitrocellulose is the main energetic material present. Other ingredients and additives are added to obtain suitable form, desired burning characteristics, and stability.

The multi-base propellants may be divided into double-base and triple-base propellants, both of which contain typically nitroglycerin to facilitate the dissolving of the nitrocellulose and enhance its energetic qualities. The nitroglycerin also increases the sensitivity, the flame temperature, burn rate, and tendency to detonate. The higher flame temperature serves to decrease the smoke and residue, but increases flash and gun-tube erosion.

Triple-base propellants are double-base propellants with the addition of nitroguanidine to lower the flame temperature, which produces less tube erosion and flash. The major drawback is the limited supply of the raw material nitroguanidine.

In the multi-base propellants, the multiple ingredients are evenly distributed in the propellant charge.

Once ignition is achieved, it is desirable to have the propellant burn in a controlled manner from the surface of the propellant charge inwardly. As the propellant is initially ignited and gases are being generated, the projectile is either at rest or moving relatively slowly. Thus, gases are being generated faster than the volume of the chamber is increasing. As a result of this, the pressure experienced increases. As the projectile accelerates, the volume of the chamber increases at a rate which ultimately surpasses the rate of gas generation by the burning of the propellant material. The transition corresponds to the point of maximum pressure in the combustion chamber. Thereafter the pressure decreases as the projectile continues to accelerate thus increasing the volume of the chamber at a rate faster than the increase in volume of gases being generated by the propellant burn.

Solid propellants are designed to produce a large volume of gases at a controlled rate. Gun barrels and some rocket casings are designed to withstand a fixed maximum gas pressure. The pressure generated can be limited to this maximum value by controlling the rate of burning of the propellant. In the art, the burn rate is controlled by varying the following factors:

(1) the size and shape of the grain, including perforations,
(2) the web thickness or amount of solid propellant between burning surfaces; the thicker the web, the longer the burning time,
(3) the linear burn rate, which depends on the gas pressure and the chemical composition of the propellant, including volatile materials, inert matter, and moisture present.

When a propellant burns in a confined space, the rate of burning increases as both temperature and pressure rise. Since propellants burn only on exposed surfaces, the rate of gas evolution or changes in pressure will also depend upon the area of propellant surface ignited.

The use of perforations in a propellant charge so as to control the rate of burning is for instance known from U.S. Pat. No. 4,386,569. This patent is based on the insight that the burn rate of the propellant material, i.e. the burn characteristics of the propellant charge, not only depends on the physical and chemical characteristics of the propellant material itself, but also depends on the shape of the propellant charge. U.S. Pat. No. 4,386,569 accordingly describes a propellant grain of generally cylindrical shape having a plurality of longitudinal substantially parallel perforations extending there through, the cross-sectional locations of said perforations being such that the interstitial distances between adjacent perforations is substantially equal and substantially equals the extrastitial distances between the perimetric perforations and the outer surface of the grain wall.

With the conventional preparation methods (such as extrusion), only charges of limited geometries heretofore could be economically manufactured. Consequently, the number of variables that could be manipulated to achieve a given specified performance was limited. It would therefore be desirable to find improved preparation methods that allow further variables to be manipulated in order to create a prolonged maximum pressure. Such improved preparation methods, however, may also require special energetic compositions.

Curable energetic compositions have been explored in the art as well. For example, both U.S. Pat. Nos. 4,050,968 and 4,283,237 describe a curable explosive composition that may be cured using heat. As understood, curing energetic compositions by heat may lead to undesirable safety issues because of proximity to the decomposition temperature of energetic materials that are present. Additionally, heat curing can lead to bad resolution in additive manufacturing processing, and in general yields a process that is difficult to control.

Object of the present invention is to overcome one or more of the disadvantages of the prior art.

The inventors found that this objective can, at least in part, be met by providing an energetic composition that is suitable for additive manufacturing, and may also be useful for other processing techniques. This allows manufacturing of propellant charges or grains with remarkable degrees of freedom. For example, such an energetic composition allows manufacturing propellant charges or grains having linear burn rate gradients in multiple directions.

Accordingly, in a first aspect the invention is directed to a radiation curable energetic composition, comprising
(a) one or more polymerisable components,
(b) one or more polymerisation photoinitiators, and
(c) one or more energetic components.

The term "energetic component" as used in this application is meant to refer to any substance or mixture of substances that, through chemical reaction, is capable of rapidly releasing energy. In the context of this application, an energetic component comprises fuel and oxidiser. Typically, energetic materials are solid, liquid or gaseous substances or mixtures which are capable of very fast chemical reactions without the use of additional reactive species (e.g. oxygen). The reaction can be initiated by means of mechanical, thermal or shock wave stimuli. Generally the reaction products are gaseous. Energetic components can be applied in explosives, rocket and gun propellants, pyrotechnics, gas generators etc. The energetic components of the present invention are distinguished from solid propellants used in hybrid rockets, which are only capable of a chemical reaction once they are brought into contact with the additional liquid (or gas) propellant that is initially kept separate from the solid propellant. Such propellants for hybrid rockets are, for instance, known from US-A-2009/0 217 525 and US-A-2013/0 042 596.

The term "energetic composition" as used in this application is meant to refer to a composition that comprises one or more energetic components.

The term "burn rate" as used in this application is meant to refer to the rate at which a propellant charge releases gas during combustion. The burn rate is commonly measured as the mass of pyrotechnic composition consumed per unit time, e.g., g/s. The term "linear burn rate" as used in this application on the other hand is meant to refer to the distance the burning surface of a pyrotechnic composition advances inwardly (perpendicular to the burning surface) per unit time. The linear burn rate is commonly reported as distance per unit time, e.g., mm/s.

The term "additive manufacturing" as used in this application is meant to refer to a method of making a three-dimensional solid object from a digital model. Additive manufacturing is achieved using an additive process, where successive layers of material are laid down in different shapes. Additive manufacturing is sometimes known as "3D printing", "additive layer manufacturing" (ALM) or "rapid prototyping". More in particular, additive manufacturing is a group of processes characterised by manufacturing three-dimensional components by building up substantially two-dimensional layers (or slices) on a layer by layer basis. Each layer is generally very thin (for example between 20-1000 µm, 20-800 µm, 20-500 µm, or even 20-100 µm) and many layers are formed in a sequence with the two-dimensional shape varying on each layer to provide the desired final three-dimensional profile. In contrast to traditional "subtractive" manufacturing processes where material is removed to form a desired component profile, additive manufacturing processes progressively add material to form a net shape or near net shape final component.

Advantageously, the invention allows to better regulate the burning of the propellant charge or grain so as to prolong the period of maximum pressure at which the projectile is accelerated. As a result of the prolonged period of maximum pressure, the projectile will be given a higher speed. Further, the production of energetic objects by means of additive manufacturing allows to provide the end product with specific properties that were heretofore not possible. The composition may also be extruded, followed by curing. This provides further degrees of freedom for manufacturing new end products.

The energetic composition of the invention is curable by means of radiation, more particular electromagnetic radiation. The electromagnetic radiation can be selected from the group consisting of X-rays, ultraviolet light, visible light, infrared radiation and combinations thereof.

In a preferred embodiment, the one or more polymerisable components comprise one or more energetic polymerisable components.

The radiation curable energetic composition of the invention can comprise a free radical polymerisation system consisting of (a1) one or more free radical polymerisable components and (b1) one or more polymerisation photoinitiators for free radical polymerisation.

Alternatively, or in addition, the radiation curable composition of the invention can comprise a cationic polymerisation system consisting of (a2) one or more cationically polymerisable components and (b2) one or more polymerisation photoinitiators for cationic polymerisation.

The amount of polymerisable components in the composition can suitably be 5-45% by total weight of the composition, preferably 10-40%, more preferably 15-35%. These polymerisable components can include free radical polymerisable components and cationically polymerisable components. Preferably, the polymerisable component at least comprises a free radical polymerisable component.

Suitable free radical polymerisable components include aliphatic (meth)acrylates, aromatic (meth)acrylates, cycloaliphatic (meth)acrylates, arylaliphatic (meth)acrylates, and heterocyclic (meth)acrylates, (cyclo)aliphatic vinyl ethers, aromatic vinyl ethers, (cyclo)aliphatic allyl ethers, unsaturated polyesters, alkenes, styrene, or combinations thereof.

The free radical polymerisable components may comprise monomers, oligomers, and/or polymers. They may be monofunctional or polyfunctional, i.e. have one or more functional groups that can polymerise by free radical polymerisation.

Examples of monofunctional free-radical polymerisable components include isohornyl (meth)acrylate, bornyl (meth)acrylate, tricyclodecanyl (meth)acrylate, dicyclopentanyl (meth)acrylate, dicyclopentenyl (meth)acrylate, cyclohexyl (meth)acrylate, benzyl (meth)acrylatea, 4-butylcyclohexyl (meth)acrylate, acryloyl morpholine (meth)acrylic acid, 2-hydroxyethyl (meth)aerylate, 2-hydroxypropyl (meth)acrylate, 2-hydroxybutyl (meth)aerylate, methyl (meth)aerylate, ethyl (meth)acrylate, propyl (meth)acrylate, isopropyl (meth)aerylate, butyl (meth)acrylate, amyl (meth)acrylate isobutyl (meth)acrylate, t-butyl (meth)acrylate, pentyl (meth)acrylate, caprolactone acrylate, isoamyl (meth)aerylate, hexyl (meth)acrylate, heptyl (meth)aerylate, octyl (meth)aerylate, isooetyl (meth)aerylate, 2-ethythexyl (meth)acrylate, nonyl (meth)acrylate, decyl (meth)aerylate, isodecyl (meth)aerylate, tridecyl (meth)aerylate, undecyl (meth)aerylate, lauryl (meth)acrylate, stearyl (meth)acrylate, isostearyl (meth)acrylate, tetrahydrofurfuryl (meth)acrylate, butoxyethyl (meth)acrylate, ethoxydiethylene glycol (meth)acrylate, benzyl (meth)acrylate, phenoxyethyl (meth)acrylate, polyethylene glycol. mono(meth)acrylate, polypropyolene glycol mono(meth)acrylate, methoxyethylene glycol (meth)acrylate ethoxyethyl (meth)acrylate, methoxypolyethylene glycol (meth)acrylate, methoxypolypropylene glycol (meth)acrylate, diacetone (meth)acrylamide, β-carboxyethyl (meth)acrylate, phthalic acid (meth)acrylate, dimethylaminoethyl (meth)acrylate, butylcarbamylethyl (meth)acrylate, n-isopropyl (meth)acrylamide fluorinated (meth)acrylate, 7-amino-3,7-dim4thyloctyl (meth)acrylate, and phosphoric acid (meth)acrylates. Further, vinyl ethers and allyl ethers can also be used.

Examples of polyfunctional free radical polymerisable components include those with (meth)acryloyl groups such as trimethylolpropane tri(meth)acrylate, pentaerythritol (meth)acrylate, ethylene glycol di(meth)acrylate, diethylene glycol di(meth)acrylate, triethylene glycol diacrylate, bisphenol A diglycidyl ether di(meth)acrylate, dicyclopentadiene dimethanol di(meth)acrylate, [2-[1,1-dimethyl-2-[(1-oxoallyl)oxy]ethyl]-5-ethyl-1,3-dioxan-5-yl]methyl acrylate, 3,9-bis(1,1-dimethyl-2-hydroxyethyl)-2,4,8,10-tetraoxaspiro[5.5]undecane di(meth)acrylate, dipentaerythritol monohydroxypenta(meth)acrylate, proposylated trimethylolpropane tri(meth)acrylate, propoxylated neopentyl glycol di(meth)acrylate, tetraethylene glycol di(meth)acrylate, polyethylene glycol di(meth)acrylate, 1,4-butanediol di(meth)acrylate, 1,6-hexanediol di(meth)acrylate, neopentyl glycol di(meth)acrylate, polybutanediol di(meth)acrylate, tripropyleneglycol di(meth)acrylate, glycerol tri(meth)acrylate phosphoric acid di(meth)acrylates, $C_7$-$C_{20}$ alkyl di(meth)acrylates, tris(2-hydroxyethyl)isocyanurate tri(meth)acrylate, tris(2-hydroxyethyl)isocyanurate di(meth)acrylate, pentaerythritol tri(meth)acrylate, pentaerythritol tetra(meth)acrylate, dipentaerythritol hexa(meth)acrylate, tricyclodecane diyl dimethyl di(meth)acrylate and alkoxylated versions (e.g., etboxylated and/or propoxylated) of any of the above-mentioned monomers, and also di(meth)acrylates of a diol which is an ethylene oxide or propylene oxide adduct to bisphenol A, di(meth)acrylate of a diol which is an ethylene oxide or propylene oxide adduct to hydrogenated bisphenol A, epoxy (meth)acrylate which is a (meth)acrylate adduct to bisphenol A of diglycidyl ether, diacrylate of polyoxyalkylated bisphenol A, and triethylene glycol divinyl ether, and adducts of hydroxyethyl acrylate. Preferred free radical polymerisable components include trimethylolpropane tri(meth)acrylate and triethylene glycol di(meth)acrylate.

It is particularly advantageous if the one or more polymerisable components in the radiation curable energetic composition of the invention comprises one or more energetic free radical polymerisable components.

Suitable examples of energetic free radical polymerisable components include 2,2,2-trinitroethyl (meth)acrylate, 2,2-dinitropropyl (meth)acrylate, 2,2-dinitropropyl di(meth)acrylate, 2-nitroethyl (meth)acrylate, beta-nitratoethyl (meth)acrylate, and pentaerythritol trinitrate (meth)acrylate. Further examples of energetic free radical polymerisable components include fluoroacrylates, such as 1,1,7-trihydroperfluoroheptyl(meth)acrylate, 1,1-dihydroperfluorooctyl(meth)acrylate, 1,2,4,5-tetrakis(difluoroamino)amyl (meth)acrylate, 2,3-bis(difluoroaminopropyl) (meth)acrylate, 2-(N-butyl)-perfluorooctane sulphonamide ethylacrylate, 2,-fluoro-2,2-dinitroethylacrylate. Any combination of the above mentioned free radical polymerisable components may be used.

The free radical polymerisable component may be present in the composition in an amount of 5-45% by total weight of the composition, preferably 10-40%, more preferably 15-35%.

A free radical polymerisable component is used together with a polymerisation photoinitiator for free radical polymerisation. Such photoinitiators can be classified in photoinitiators that form radicals by cleavage, known as "Norrish type I", and photoinitiators that form radicals by hydrogen abstraction, known as "Norrish type II". The Norrish type II photoinitiators require a hydrogen donor, which serves as the free radical source. Photolysis of aromatic ketones, such as benzophenone, thioxanthones, benzyl, and quinones, in the presence of hydrogen donors, such as alcohols, amines, or thiols leads to the formation of a radical produced from the carbonyl compound (ketyl-type radical) and another radical derived from the hydrogen donor. The photopolymerisation of vinyl monomers is usually initiated by the radicals produced from the hydrogen donor. The ketyl radicals are usually not reactive toward vinyl monomers because of the steric hindrance and the delocalisation of an unpaired electron.

Examples of photoinitiators for free radical polymerisation include 2,4,6-trimethylbenzoyl diphenyl phosphine oxide, 2,4,6-trimethylbenzoyl phenyl ethoxy phosphine oxide, bis(2,4,6-frimethylbenzoyl)-phenyl phosphine oxide, 2-methyl-1-[4-(methylthio)phenyl]-2-morpholinopropanone-1, 2-benzyl-2-(dimethylamino)-1[4-(4-moprholinyl)phenyl]-1-butanone, 2-dimethylamino-2-(4-methyl-benzyl)-1-(4-morpholin-4-yl-benzyl)-butan-1-one, 4-benzoyl-4'-methyl diphenyl sulphide, 4,4'-bis(diethylamino) benzophenone, and 4,4'-bis(N,N'-dimethylamino) benzophenone (Michler's ketone), benzophenone, 4-methyl benzophenone, 2,4,6-trimethyl benzophenone, dimethoxybenzophenone, 1-hydroxycyclohexyl phenol ketone, phenyl (1-hydroxylsopropyl)ketone, 2-hydroxy-1-[4-(2-hydroxyethoxy)phenyl]-2-methyl-1-propanone, 4-isopropylpenyl (1-bydroxyisopropyl)ketone, oligo-[2-hydroxy-2-methyl-1-[4-(1-methylvinyl)phenyl]propanone], camphorquinone, 4,4'-bis(diethylamino)benzophenone, benzyl dimethyl ketal, bis(eta 5-2-4-cyclopentadien-1-yl) bis[2,6-difluoro-3-(1H-pyrrol-1-yl)phenyl] titanium, and combinations thereof. Preferred photoinitiators for free radical polymerisation include 2,4,6-trimethylbenzoyl diphenyl phosphine oxide, 2,4,6-trimethylbenzoyl phenyl ethoxy phosphine oxide, and bis (2,4,6-trimethylbenzoyl)-phenyl phosphine oxide.

The polymerisation photoinitiator for free radical polymerisation may be present in the composition in an amount of 0.05-3% by total weight of the composition, such as 0.1-2%, or 0.2-1.5%.

Examples of cationically polymerisable components include cyclic ether compounds such as epoxy compounds and oxetanes, cyclic lactone compounds cyclic acetal compounds, cyclic thioether compounds, spiro orthoester compounds and vinyl ether compounds. Specific examples of cationically polymerisable components include bisphenol A diglycidyl ether, bisphenol F diglycidyl ether, bisphenol S diglycidyl ether, brominated bisphenol A diglycidyl ether, brominated bisphenol F diglycidyl ether, brominated bisphenol S diglycidyl ether, epoxy novolac resins, hydrogenated bisphenol A diglycidyl ether, hydrogenated bisphenol F diglycidyl ether, hydrogenated bisphenol S diglydicyl ether, 3,4-epoxycyclohexylmethyl-3',4'-epoxycyclohexane carboxylate, 2-(3,4-epoxycyclohexyl-5,5-spiro-3,4-epoxy)-cyclohexne-1,4-dioxane, bis(3,4-epoxycydohexylmethyl) adipate, vinylcyclohexene oxide, 4-vinylepoxycyclohexane, viniylcyclohexene dioxide, limonene oxide, limonene dioxide, bis(3,4-epoxy-6-methycycoohexylmethyl)adipate, 3,4-epoxy-6-methylcyclohexyl-3',4'-epoxy-6'-methylcyclohexane carboxylate, ε-caprolactone-modified 3,4-epoxycyclohexylmethyl-3',4'-epoxycyclohedxane carboxylates, trimethylcaprolactone-modified 3,4-epoxycyclohexylmethyl-3',4'-epoxycylohexane carboxylates, β-methyl-δ-valerolactone-modified 3,4-epoxycyclohexylmethyl-3',4'-epoxycyclohexane carboxylates, methylene bis(3,4-epoxycyclohexane), bicyclohexyl-3,3'-epoxide, bis(3,4-epoxycyclohexyl) with a linkage of —O—, —S—, —SO—, —SO$_2$—, —C(CH$_3$)—, —CBr$_2$—, —C(CBr$_3$)$_2$—, —C(CF$_3$)$_2$—, —C(CCl$_3$)$_2$—, or —CH(C$_6$H$_5$)—, dicyclopentadiene diepoxide, di(3,4-epoxycyclohexylmethyl)ether of ethylene glycol, ethylene bis(3,4-epoxycyclohexanecarboxylate), epoxyhexahydrodioctylphthalate, epoxyhexahydro-di-2-ethylhexyl phthalate, 1,4-butanediol diglycidyl ether, 1,6-hexanediel diglycidyl ether, neopentylglycol diglycidyl ether, glycerol triglycidyl ether, trimethylolpropane triglycidyl ether, polyethylene glycol diglycidyl ether, polypropylene glycol diglycidyl ether, diglycidyl esters of aliphatic long-chain dibasic acids, nionoglycidyl ethers of aliphatic higher alcohols, monoglycidyl ethers of phenol, cresol, butyl phenol, or polyether alcohols obtained by the addition of alkylene oxide to these compounds, glycidyl esters of higher fatty acids, epoxidated soybean oil, epoxidated polybutadiene, 1,4-bis(3-ethylo-3-oxetanyhmethoxy) methyl]benzene, 3-ethyl-3-hydroxymethyloxetane, 3-ethyl-3-(3-hydroxypropypyl)oxymethyloxetane, 3-ethyl-3-(4-hydroxybutyl)oxymethyloxetane, 3-etbyl-3-(5-hydroxypentyl)oxymethyloxetane, 3-ethyl-3-phenoxymethyloxetane, bis(1-ethyl(3-oxetanyl)methyl) ether, 3-ethyl-3-((2-ethylhexyloxy)methyl)oxetane, 3-ethyl-((triethoxysilylpropoxymethyl)oxetane, 3-(meth)allyloxymethyl-3-ethyloxetane, 3-hydroxymethyl-3-ethyloxetane, (3-ethyl-3-oxetanylmethoxy)methylbenzene, 4-fluoro-1-(3-ethyl-3-oxetanylmethoxy)methyl]benzene, 4-methoxy-[1-(3-ethyl-3-oxetanylmethoxy)methyl]-benzene, [1-(3-ethyl-3-oxetanylmethoxy)ethyl]phenyl ether, isobutoxymethyl(3-ethyl-3-oxetanylmethyl)ether, 2-ethythexyl(3-ethyl-3-oxetanylmethyl)ether, ethyldiethylene glycol(3-ethyl-3-oxetanylmethyl)ether, dicylcopentadiene (3-ethyl-3-oxetanylmethyl)ether, dicyclopentenyloxyethyl(3-ethyl-3-oxetanylmethyl)ether, dicyclopentenyl(3-ethyl-3-oxetanylmethyl)ether, tetrahydrofurfuryl(3-ethyl-3-oxetanylmethyl)ether, 2-hydroxyethyl(3-ethyl-3-oxetanylmethyl)ether, 2-hydroxypropyl(3-ethyl-3-oxetanylmethyl)ether, and combinations thereof.

The cationically polymerisable component may be present in the composition in an amount of 5-45% by total weight of the composition, preferably 10-40%, more preferably 15-35%. If the cationically polymerisable component comprises an oxetane, then the oxetane is usually present in an amount of 5-20% by total weight of the composition, such as 7-15%.

A cationically polymerisable component is used together with polymerisation photoinitiator for cationic polymerisation. Suitable photoinitiators for cationic polymerisation include onium salts, halonium salts, iodosyl salts, selenium salts, sulphonium salts, sulphoxonium salts, diazoniuin salts, metallocene salts, isoquinolinium salts, phosphonium salts, arsonium salts, tropylium salts, dialkylphenacylsulphonium salts, thiopyrilium salts, diaryl iodonium salts, triaryl sulphonium salts, ferrocenes, di(cyclopentadienyliron)arene salt compounds, pyridinium salts, and combinations thereof. Typically, the photoinitiator for cationic polymerisation can be selected from triarylsulphonium salts, diaryliodonium salts, metallocene based compounds, and combinations thereof.

The photoinitiator for cationic polymerisation can suitably have an anion selected from the group consisting of BF$_4^-$, AsF$_6^-$, SbF$_6^-$, PF$_6^-$, [B(CF$_3$)$_4$]$^-$, B(C$_6$F$_5$)$_4^-$, B[C$_6$H$_3$-3,5(CF$_3$)$_2$]$_4^-$, B(C$_6$H$_4$CF$_3$)$_4^-$, B(C$_6$H$_3$F$_2$)$_4^-$, B[C$_6$F$_4$-4(CF$_3$)]$_4^+$, Ga(C$_6$F$_5$)$_4^-$, [(C$_6$F$_5$)$_3$B—C$_3$H$_3$N$_2$—B(C$_6$F$_5$)$_3$]$^-$, [(C$_6$F$_5$)$_3$—NH$_2$—B(C$_6$F$_5$)$_3$]$^-$, tetrakis(3,5-difluoro-4-alkyloxyphenyl)borate, tetrakis(2,3,5,6-tetrafluoro-4-alkyloxyphenyl)borate, perfluoroalkylsulphonates, tris[(perfluoroalkyl)sulphonyl]methides, bis[(perfluoroalkyl)sulphonyl] imides, perfluoroalkylphosphates, tris(perfluoroalkyl) trifluorophosphates, bis(perfluoroalkyl) tetrafluorophosphates, tris(pentafluoroethyl) trifluorophosphates, and (CH$_6$B$_{11}$Br$_6$)$^-$, (CH$_6$B$_{11}$Cl$_6$)$^-$ and other halogenated carborane anions.

Some further examples of photoinitiators for cationic polymerisation include 4-[4-(3-chlorobenzoyl)phenylthio] phenyl bis(4-fluorophenyl)sulphonium hexafluoroantimonate, 4-[4-(3-chlorobenzoyl)phenylthio]phenyl bis(4-fluoronhenyl)sulphonium tetrakis(pentafluorophenyl)borate, 4-[4-(3-chlorobenzoyl)phenylthio]phenyl bis(4-fluorophenyl)sulphonium tetrakis(3,5-difluoro-4-methyloxyphenyl) borate, 4-[4-(3-chlorobenzoyl)phenylthio]phenyl bis(4-fluorophenyl)sulphonium tetrakis(2,3,5,6-tetrafluoro-4-methyloxyphenyl)borate, tris(4-(4-acetylphenyl)thiophenyl) sulphonium tetrakis(pentafluorophenyl)borate, tris(4-(4-acetylphenyl)thiophenyl)sulphonium tris[(trifluoromethyl) sulphonyl]methide, tris(4-(4-acetylphenyl)thionhenyl) sulphonium hexafluorophosphate, bis[4-diphenyisulphoniumphenyl]sulphide bis (hexafluoroantimonate), thiophenoxyphenylsulphonium hexafluoroantimonate, [4(1-methylethyl)phenyl] (4-methylphenyl) iodonium tetrakis(pentafluorophenyl)borate, 4-[4-(2-chlorobenzoyl)phenylthio]phenyl bis(4-fluorophenyl) sulphonium hexafluoroantimonate, and aromatic sulphonium salts with anions of (PF$_{6-m}$(C$_n$F$_{2n+1}$)$_m$)$^-$ where m is an integer from 1 to 5, and n is an integer from 1 to 4.

The use of aromatic triaryl sulphonium salts as photoinitiator for cationic polymerisation is desirable in additive manufacturing because the resulting composition attain a fast photospeed, good thermal stability, and good photo stability.

The polymerisation photoinitiator for cationic polymerisation may be present in the composition in an amount of 0.05-3% by total weight of the composition, such as 0.1-2%, or 0.2-1.5%.

The energetic component that is comprised in the radiation curable energetic composition of the invention may be polymerisable or non-polymerisable. In an embodiment, at least part of the energetic components in the energetic composition are polymerisable components. Hence, in such as case components (a) and (c) may overlap. In an embodiment, at least part (such as all) of the energetic components are radiation curable components, i.e. can be cured by exposing the components to actinic radiation.

Some examples of suitable energetic materials include 2,4,6-trinitrotoluene (TNT), cyclo-1,3,5-trimethylene-2,4,6-trinitramine (RDX), cyclotetramethylenetetranitramine (HMX), pentaerythrol tetranitrate (PETN), 3-nitro-1,2,4-triazol-5-one (NTO), nitroglycerine (NG), nitrocellulose (13% N) (NC), ammonium nitrate (AN), potassium nitrate, hydrazine nitrate, lithium nitrate, ammonium perchlorate (AP), potassium perchlorate, 2,4,6,8,10,12-(hexanitrohexaaza)tetracyclododecane (CL20 or HNIW), 1,3,3-trinitroazetidine (TNAZ), octanitrocubane (ONC), 1,1-diamino-2,2-dinitroethene (FOX-7), ammonium dinitramide (ADN), 2,2,2-trinitroethylacrylate, 2,2,2-trinitroethyimethacrylate (TNEM), 2,2-dinitropropylacrylate (DNPA), 2-nitroethylacrylate, and pentaerythritoltrinitrate acrylate.

The energetic component can be liquid or solid. Preferably, at least part of the energetic component is solid. In an embodiment the energetic component is solid. The solid energetic component can be in the form of particulates, which may have an average particle size as determined by laser diffraction of 0.5-100 µm, preferably 1-60 µm, more preferably 2-40 µm. Such particles have excellent burn behaviour and mechanical strength, Smaller particles are not preferred due to the increase in viscosity. The solid energetic component can also be in the form of nanoparticles.

The energetic component may be present in the composition in an amount of 30% or more by total weight of the composition, such as 40-95%, or 45-90%. These amounts include the possibility that polymerisable components and optional plasticiser in the composition are also energetic components.

The radiation curable energetic composition of the invention may further comprise a hydroxy functional component. The hydroxy functional component may have a hydroxyl functionality of at least one. Suitable hydroxy functional components preferably contain one or more primary or secondary aliphatic hydroxyl. The hydroxyl group may be internal in the molecule or terminal.

Examples of suitable hydroxy functional components include alkanols, monoalkyl ethers of polyoxyalkylene glycols, monoalkyl ethers of alkylene glycols, alkylene and arylalkylene glycols and polyols. Particular examples of suitable hydroxy functional components include 1,2,4-butanetriol, 1,2,6-hexanetriol, 1,2,3-heptanetriol, 2,6-dimethyl-1,2,6-hexanetriol, (2R,3R)-(−)-2-benzyloxy-1,3,4-butanetriol, 1,2,3-hexanetriol, 1,2,3-butanetriol, 3-methyl-1,3,5-pentanetriol, 1,2,3-cyclohexanetriol, 1,3,5-cyclohexanetriol, 3,7,11,15-tetramethyl-1,2,3-hexadecanetriol, 2-hydroxyinethyltetrahydropyran-3,4,5-triol, 2,2,4,4-tetramethyl-1,3-cyclobutanedial, 1,3-cyclopentanediol, trans-1,2-cyclooctanediol, 1,16-hexadecanediol, 3,6-dithia-1,8-octanediol, 2-butyne-1,4-diol, 1,3-propanediol, 1,4-butanediol, 1,5-pentanediol, 1,6-hexanediol, 1,7-heptanediol, 1,8-octanediol, 1,9-nonanediol, 1-phenyl-1,2-ethanedial, 1,2-cycloliexanediol, 1,5-decalindiol, 2,5-dimethyl-3-hexyne-2,5-diol, 2,7-dimethyl-3,5-octacdiyne-2,7-diol, 2,3-butanediol, 1,4-cyclohexanedimethanol, and combinations thereof.

Also oligomeric and polymeric hydroxy functional components can be used. Examples thereof include polyoxyethylene and polyoxypropylene glycols and triols with number average molecular weights of 200-10 000 g/mol, polytetramethylene glycols of varying molecular weights, poly(oxyethylene-oxybutylene) random or block copolymers, copolymers containing pendant hydroxy groups formed by hydrolysis or partial hydrolysis of vinyl acetate copolymers, polyvinylacetal resins containing pendant hydroxyl groups, hydroxy-terminated polyesters and hydroxy-terminated polylactones, hydroxy-functionalised polyalkadienes, such as polybutacdiene, aliphatic polycarbonate polyols, such as an aliphatic polycarbonate diol, and hydroxy-terminated polyethers, and combinations thereof. Preferred polyether polyols are polypropylene glycols of various molecular weight. Especially preferred are linear and branched polytetrahydrofuran polyether polyols available in various molecular weights, such as in the range of 150-4000 g/mol, in the range of 150-1500 g/mol, or in the range of 150-750 g/mol.

The hydroxy functional component may be present in the composition in an amount of 0-10% by total weight of the composition, such as 0-5%, or 0.1-3%, or 0.2-2%.

A representative radiation curable energetic composition according to the invention comprises
- 5-45% by total weight of the composition of polymerisable components, preferably 10-40%, even more preferably 15-35%;
- 0.05-3% by total weight of the composition of polymerisation photoinitiators (preferably photoinitiators), preferably 0.1-2%, even more preferably 0.2-1.5%;
- 30% or more by total weight of the composition of energetic components, such as 40-95%, or 45-90%; and
- 0-10% by total weight of the hydroxy functional component, preferably 0.5-8%, even more preferably 1-5%.

Preferably, the radiation curable energetic composition of the invention comprises one or more plasticisers. The use of a plasticiser in the radiation curable energetic composition of the invention is to tune the mechanical properties of the cured object and/or to tune the total energetic value of the composition. The plasticiser may also be added in order to tune the viscosity of the radiation curable energetic composition during additive manufacturing. These plasticisers may or may not be energetic. In a preferred embodiment, the one or more plasticisers comprise one or more energetic plasticisers.

Some examples of suitable non-energetic plasticisers include acid esters such as dialkyl esters of phthalic acids, triorgano esters of phosphoric acid, dialkyl esters of adipic acid, trimellitic esters, fatty acid esters, acetic esters, maleic esters, fumaric esters, citric esters. Explicit examples include di-n-octyl phthalate, dimethyl phthalate, diethyl phthalate, dibutyl phthalate, diheptyl phthalate and di-2-ethylhexyl phthalate, tributyl phosphate, tri-2-ethylhexyl phosphate, triphenyl phosphate and tricresyl phosphate, dibutyl adipate and di-n-octyl adipate, tri-2-ethylhexyltrimellitate, dimethyl adipate, dibutyl adipate, diisobutyl adipate, diisonorbornyl adipate, di-2-ethylhexyl adipate, diisodecyl adipate, diethylene glycol adipate, dibutyl diglycol adipate, di-2-ethylhexyl azelate, dimethyl sebacate, dibutyl sebacate, di-2-ethylbexyl sebacate, methyl acetyltricinolate, epoxidised soybean oil, glyceryl triacetate, 2-ethylhexyl acetate, dimethyl maleate, dibutyl maleate, di-2-ethylhexyl maleate, dibutyl fumarate, di-2-ethylhexyl fumarate, trimethyl citrate, triethyl citrate, tripropyl citrate, triisobutyl citrate, acetylated monoglycerides, acetyl triethyl citrate, acetyl tributyl citrate, triacetin, benzyl benzoate, glycerol, polyethylene glycols, oleic acid, castor oil, corn oil, camphor, sorbitol, and combinations thereof.

Some examples of suitable energetic plasticisers include alkyl ethyl nitramnines, in particular the homologous series based on N-(2-nitroxyethyl) nitrainine, $NO_2$—N—$CH_2CH_2ONO_2$. Explicit examples include N-(2-nitroxyethyl) methylnitramine, N-(2-nitroxyethyl) ethylnitramine, N-(2-nitroxyethyl) n-propylnitramine, N-(2-nitroxyethyl) n-butylnitramine, N-(2-nitroxypropyl) methylnitramine and N-(2-nitroxyethyl) cyclohexylnitramine. Further examples include dinitroxydiethyl nitramine, nitroglycerin, 1,2,4-butane triol trinitrate, 1,5-diazido-3-nitrazapentane, bis(2-fluoro-2,2-dinitroethyl)formal, triethyleneglycol dinitrate, bis(2,2-dinitropropyl)formal, bis(2,2-dinitropropyl)acetal, diglycol dinitrate, and combinations thereof.

The plasticiser may be present in the composition in an amount of 0-40% by total weight of the composition, such as 10-35%, or 15-30%.

In a preferred embodiment, the radiation curable energetic composition of the invention comprises a dye and/or a pigment. This can be advantageous in an additive manufacturing method. The dye and/or pigment can, for instance, ensure that the irradiation light is absorbed in the layer that is intended to cure (typically the layer closest to the irradiation source) and that the light does not penetrate deeper to other layers. The amount of dyes anchor pigments in the radiation curable energetic composition can, for instance, be 0-0.1% by total weight of the composition, such as 0.005-0.02% by total weight of the composition.

The radiation curable energetic composition of the invention may further comprise one or more additives, such as fuels, oxidisers, dispersants, photosensitisers, fillers, stabilising agents, dyes, pigments, antioxidants, wetting agents, explosive desensitisers, defoamers, and surfactants.

In a further aspect, the invention is directed to a method of forming a three-dimensional energetic object comprising the steps of forming and selectively curing a layer of the radiation curable energetic composition according to the invention with actinic radiation and repeating the steps of forming and selectively curing a layer of the radiation curable energetic composition according to the invention a plurality of times obtain a three dimensional energetic object.

Optionally, the obtained three-dimensional energetic object, may be subjected to post-curing by heat and/or actinic irradiation. Post-curing can aid in curing possible unreacted components in the radiation curable composition, can control stickiness of the surface of the object, and can improve the initial strength of the object.

The actinic radiation used in the method of the invention and in the optional post-curing is preferably ultraviolet radiation. The term "ultraviolet radiation" as used in this application includes typical wavelengths for ultraviolet curing in the range of 200-500 nm (near ultraviolet").

In yet a further aspect, the invention is directed to a three-dimensional energetic object formed from the radiation curable energetic composition or by the method according to the invention.

In yet a further aspect, the invention is directed to the use of a radiation curable energetic composition according to the invention in ballistics, pyromechnical devices (including actuators), fireworks or solid or hybrid propellant rockets.

The invention has been described by reference to various embodiments, compositions and methods. The skilled person understands that features of various embodiments, compositions and methods can be combined with each other.

All references cited herein are hereby completely incorporated by reference to the same extent as if each reference were individually and specifically indicated to be incorporated by reference and were set forth in its entirety herein.

The use of the terms "a" and "an" and "the" and similar referents in the context of describing the invention (especially in the context of the claims) are to be construed to cover both the singular and the plural, unless otherwise indicated herein or clearly contradicted by context. The terms "comprising", "having", "including" and "containing" are to be construed as open-ended terms (i.e., meaning "including, but not limited to") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention. For the purpose of the description and of the appended claims, except where otherwise indicated, all numbers expressing amounts, quantities, percentages, and so forth, are to be understood as being modified in all instances by the term "about". Also, all ranges include any combination of the maximum and minimum points disclosed and include and intermediate ranges therein, which may or may not be specifically enumerated herein.

Preferred embodiments of this invention are described herein. Variation of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject-matter recited in the claims appended hereto as permitted by applicable law. Moreover, any combination of the above-described elements in all possible variations thereof is encompassed by the invention unless otherwise indicated herein or otherwise clearly contradicted by context. The claims are to be construed to include alternative embodiments to the extent permitted by the prior art.

For the purpose of clarity and a concise description features are described herein as part of the same or separate embodiments, however, it will be appreciated that the scope of the invention may include embodiments having combinations of all or some of the features described.

The invention will now be further illustrated by the following non-limiting example.

EXAMPLE

A radiation curable energetic composition was prepared by blending the ingredients as mentioned in table 1 in the indicated amounts.

TABLE 1

| Radiation curable energetic composition | |
|---|---|
| Ingredient | wt. % |
| Non-energetic binder | 24 |
| Energetic plasticiser [1] | 24 |
| Dispersant [2] | 2 |
| Solid energetic material [3] | 50 |

[1] N-(2-nitroxyethyl) ethylnitramine
[2] Disperbyk 116 dispersant obtained from Byk
[3] RDX (cyclo-1,3,5-trimethylene-2,4,6-trinitramine)

The non-energetic binder was composed as indicated in Table 2.

TABLE 2

| Composition of non-energetic binder | |
|---|---|
| Ingredient | wt. % |
| Triethylene glycol diacrylate | 49 |
| Trimethylolpropane triacrylate | 49 |
| Photoinitiator [4] | 2 |
| Colorant [5] | <<1 |

[4] Irgacure 819 obtained from BASF
[5] Solvent Yellow 33, CAS No. 8003-22-3

The invention claimed is:

1. A method of forming a three-dimensional propellant charge having linear burn rate gradients in multiple directions, the method comprising:
   (a) forming a layer of a radiation curable energetic composition comprising:
      (i) one or more polymerisable components,
      (ii) one or more polymerisation photoinitiators, and
      (iii) one or more energetic components,
   (b) selectively curing said layer with actinic radiation, and
   (c) repeating the steps (a) and (b) a plurality of times to form said three-dimensional propellent charge, wherein said three-dimensional propellent charge has a linear burn rate gradients in multiple directions.

2. The method of claim 1, wherein said one or more polymerisable components comprise fuel and oxidiser.

3. The method of claim 1, wherein said polymerisable components comprise (a1) one or more free radical polymerisable components, and said polymerisation photoinitiators comprise (b1) one or more polymerisation photoinitiators for free radical polymerisation.

4. The method of claim 3, wherein said radical polymerisable components comprise one or more selected from the group consisting of an aliphatic (meth)acrylate, an aromatic (meth)acrylate, a cycloaliphatic (meth)acrylate, an arylaliphatic (meth)acrylate, and a heterocyclic (meth)acrylate.

5. The method of claim 1, wherein said polymerisable components comprise (a2) one or more cationically polymerisable components, and said polymerisation photoinitiators comprise (b2) one or more polymerisation photoinitiators for cationic polymerisation.

6. The method of claim 5, wherein said cationically polymerisable component comprises one or more selected from the group consisting of cyclic ether compounds, cyclic acetal compounds, cyclic thioether compounds, spiro-orthoester compounds, cyclic lactone compounds, and vinyl ether compounds.

7. The method of claim 5, wherein said cationically polymerisable component comprises one or more selected from the group consisting of a diglycidyl ether compound, an epoxy compound, and an oxetane compound.

8. The method of claim 1, wherein at least part of said energetic component comprises one or more selected from the group consisting of 2,4,6-trinitrotoluene (TNT), cyclo-1,3,5-trimethylene-2,4,6-trinitramine (RDX), cyclotetramethylenetetranitramine (HMX), pentaerythrol tetranitrate (PETN), 3-nitro-1,2,4-triazol-5-one (NTO), nitroglycerine (NG), nitrocellulose (13% N) (NC), ammonium nitrate (AN), ammonium perchlorate (AP), 2,4,6,8,10,12-(hexanitro-hexaaza) tetracyclododecane (CL20 or HNIW), 1,3,3-trinitroazetidine (TNAZ), octanitrocubane (ONC), 1,1-diamino-2,2-dinitroethene (FOX-7), ammonium dinitramide (ADN), 2,2,2-trinitroethylacrylate, 2,2,2-trinitroethylmethacrylate (TNEM), 2,2-dinitropropylacrylate (DNPA), 2-nitroethylacrylate, and pentaerythritoltrinitrate acrylate.

9. The method of claim 1, wherein at least part of said energetic components are polymerisable components.

10. The method of claim 1, wherein at least part of said energetic component is solid.

11. The method of claim 10, wherein said solid energetic component is in the form of particulates having an average particle size as determined by laser diffraction of 0.5-100 µm.

12. The method of claim 10, wherein said solid energetic component is in the form of particulates having an average particle size as determined by laser diffraction of 1-60 µm.

13. The method of claim 10, wherein said solid energetic component is in the form of particulates having an average particle size as determined by laser diffraction of 2-40 µm.

14. The method of claim 10, wherein said solid energetic component is in the form of particulates having an average particle size as determined by laser diffraction of 2-10 µm.

15. The method of claim 1, wherein at least part of said energetic component is radiation curable.

16. The method of claim 1, wherein said radiation curable energetic composition further comprises a hydroxy functional component.

17. The method of claim 1, wherein said radiation curable energetic composition comprises
   5-45% by total weight of the composition of polymerisable components;
   0.05-3% by total weight of the composition of polymerisation photoinitiators;
   30% or more by total weight of the composition of energetic components; and
   0-10% by total weight of the composition of a hydroxy functional component.

18. The method of claim 1, wherein said radiation curable energetic composition comprises
   10-40% by total weight of the composition of polymerisable components;
   0.1-2% by total weight of the composition of polymerisation photoinitiators;
   40-95% by total weight of the composition of energetic components; and
   0.5-8% by total weight of the composition of a hydroxy functional component.

19. The method of claim 1, wherein said radiation curable energetic composition comprises
   15-35% by total weight of the composition of polymerisable components;
   0.2-1.5% by total weight of the composition of polymerisation photoinitiators;
   45-90% by total weight of the composition of energetic components; and
   1-5% by total weight of the composition of a hydroxy functional component.

20. The method of claim 1, wherein said radiation curable energetic composition further comprising one or more dyes and/or pigments.

21. The method of claim 20, wherein the amount of dyes and/or pigments in the radiation curable energetic composition is 0-0.1% by total weight of the composition.

22. The method of claim 20, wherein the amount of dyes and/or pigments in the radiation curable energetic composition is 0.005-0.02% by total weight of the composition.

23. The method of claim 1, wherein the radiation curable energetic composition further comprises one or more selected from photosensitisers, fillers, stabilisers, antioxidants, wetting agents, defoamers, and surfactants.

24. The method of claim 1, further comprising a step (d) post-curing the three-dimensional object by heat, actinic radiation, or a combination thereof.

25. The method of claim 24, wherein the actinic radiation for post-curing is ultraviolet radiation.

26. The method of claim 1, wherein the actinic radiation for curing the layer of the radiation curable energetic composition is ultraviolet radiation.

27. The method of claim 1, wherein the linear burn rate gradients are configured to prolong the period of maximum gas pressure during combustion of the propellant charge.

* * * * *